United States Patent [19]
Tamagawa

[11] Patent Number: 5,889,937
[45] Date of Patent: Mar. 30, 1999

[54] HARD DISK APPARATUS CAPABLE OF TRANSFORMING LOGICAL ADDRESSES OF APPARATUS DIAGNOSIS CYLINDERS TO HDD-BY-HDD PHYSICAL ADDRESSES

[75] Inventor: Masahiro Tamagawa, Tokyo, Japan

[73] Assignee: NEC Corporation, Tokyo, Japan

[21] Appl. No.: 883,335

[22] Filed: Jun. 26, 1997

[30] Foreign Application Priority Data

Jun. 27, 1996 [JP] Japan .................................. 8-167824

[51] Int. Cl.$^6$ ................................................. G11B 20/10
[52] U.S. Cl. ....................... 395/183.18; 371/68; 711/114
[58] Field of Search ................................ 371/21.2, 68.1; 395/183.18; 711/114

[56] References Cited

U.S. PATENT DOCUMENTS

| 5,050,169 | 9/1991 | Monett | 371/21.2 |
| 5,193,184 | 3/1993 | Belsan et al. | 711/114 |

FOREIGN PATENT DOCUMENTS

| 60-27935 | 2/1985 | Japan . |
| 60-101765 | 6/1985 | Japan . |
| 2-206073 | 8/1990 | Japan . |
| 2-294816 | 12/1990 | Japan . |
| 3-44823 | 2/1991 | Japan . |
| 3-194766 | 8/1991 | Japan . |
| 3-273328 | 12/1991 | Japan . |
| 7-114445 | 5/1995 | Japan . |
| 7-152491 | 6/1995 | Japan . |
| 7-152499 | 6/1995 | Japan . |
| 8-129458 | 5/1996 | Japan . |

Primary Examiner—Ly V. Hua
Attorney, Agent, or Firm—Young & Thompson

[57] ABSTRACT

A magnetic disk apparatus includes a plurality of hard disk drives (HDDs) and a decoder for transforming logical addresses received from a host to physical addresses respectively assigned to the HDDs. The HDDs each have a magnetic disk section including at least one magnetic disk for storing data, a magnetic head section for selectively writing or reading data in or out of the magnetic disk section, and a drive control for controllably driving the magnetic head section in accordance with the physical addresses output from the decoder. The decoder has a function for transforming the logical addresses of a diagnosis command received from the host to the physical addresses of the HDDs while the drive control has a function of controlling a write/read test with the physical addresses produced by the function of the decoder. The decoder further has a function of setting the physical addressees of the radially innermost cylinders of the HDDs as the physical addresses to be diagnosed. The decoder additionally has a function of allocating, when the logical addresses of the diagnosis command are continuous addresses, dividing the logical addresses and then allocating them to the physical addresses.

5 Claims, 5 Drawing Sheets

HARD DISK APPARATUS CAPABLE OF TRANSFORMING LOGICAL ADDRESSES OF APPARATUS DIAGNOSIS CYLINDERS TO HDD-BY-HDD PHYSICAL ADDRESSES

BACKGROUND OF THE INVENTION

The present invention relates to a hard disk apparatus and, more particularly, to a magnetic disk apparatus having a single logical hard disk drive (HDD) implemented by a plurality of HDDs or physical HDDs.

A plurality of physical HDDs constituting a single logical HDD appear as if it was a single physical HDD, as seen from a host system. The logical HDD has cylinder areas each assigned to a particular physical HDD. The physical HDDs are provided with serial numbers (#1, #2 and so forth) in the ascending order of the cylinder number of the logical HDD.

It has been customary for, e.g., a host system to perform a write/read test with the above conventional magnetic disk apparatus, diagnosing the writing and reading operation of the apparatus including a drive control system. The write/read test enhances the reliability of the apparatus. The prerequisite with the write/read test is that data stored in magnetic disks by the user be protected from damage ascribable to the test.

In the HDD, user cylinders are arranged from the outer circumference toward the inner circumference and allow user's data to be written therein, as desired; only the radially innermost cylinder is assigned to diagnosis. At the time of the above test, writing and reading is executed with the innermost or diagnosis cylinder so as not to disturb the data stored in the user cylinders.

However, the problem with the conventional magnetic disk apparatus is that when the diagnosis is effected on the diagnosis cylinder of the logical HDD, it is not effected on all the physical HDDs This is because only the radially innermost cylinder of the logical HDD is assigned to the diagnosis. Specifically, the diagnosis cylinder is allocated only to a particular physical HDD, but not allocated to the other physical HDDs.

SUMMARY OF THE INVENTION

It is therefore an object of the present invention to provide a magnetic disk apparatus having a single logical HDD implemented by a plurality of physical HDDs and capable of diagnosing all the physical HDDs at a single time by use of a diagnosis program stored in, e.g., a host system.

A magnetic disk apparatus includes a plurality of HDDs and a decoder for transforming logical addresses received from a host to physical addresses respectively assigned to the HDDS. The HDDs each have a magnetic disk section including at least one magnetic disk for storing data, a magnetic head section for selectively writing or reading data in or out of the magnetic disk section, and a drive control for controllably driving the magnetic head section in accordance with the physical addresses output from the decoder. The decoder has a function for transforming the logical addresses of a diagnosis command received from the host to the physical addresses of the HDDs while the drive control has a function of controlling a write/read test with the physical addresses produced by the function of the decoder. The decoder further has a function of setting the physical addressees of the radially innermost cylinders of the HDDs as the physical addresses to be diagnosed. The decoder additionally has a function of allocating, when the logical addresses of the diagnosis command are continuous addresses, dividing the logical addresses and then allocating them to the physical addresses.

In accordance with the present invention, when a host system diagnoses HDDs, it sends to a controller a write/read command for writing and reading test data in diagnosis cylinders #1 and #2. The write/read command is transferred from the controller to a decoder included in a hard disk apparatus to be diagnosed. First, to write and read test data out of the diagnosis cylinder #1, the decoder selects a HDD #1 and then writes and reads the test data out of the diagnosis cylinder #1 assigned to the HDD #1. To write and read the test data out of the diagnosis cylinder #2, the above operation is repeated in order to select the HDD #2 and then write and read the test data out of the diagnosis cylinder #2 assigned to the HDD #1. In this manner, each HDD is provided with the respective continuous diagnosis cylinder and diagnosed individually.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DESCRIPTION OF THE PREFERRED EMBODIMENT

Figure 1:
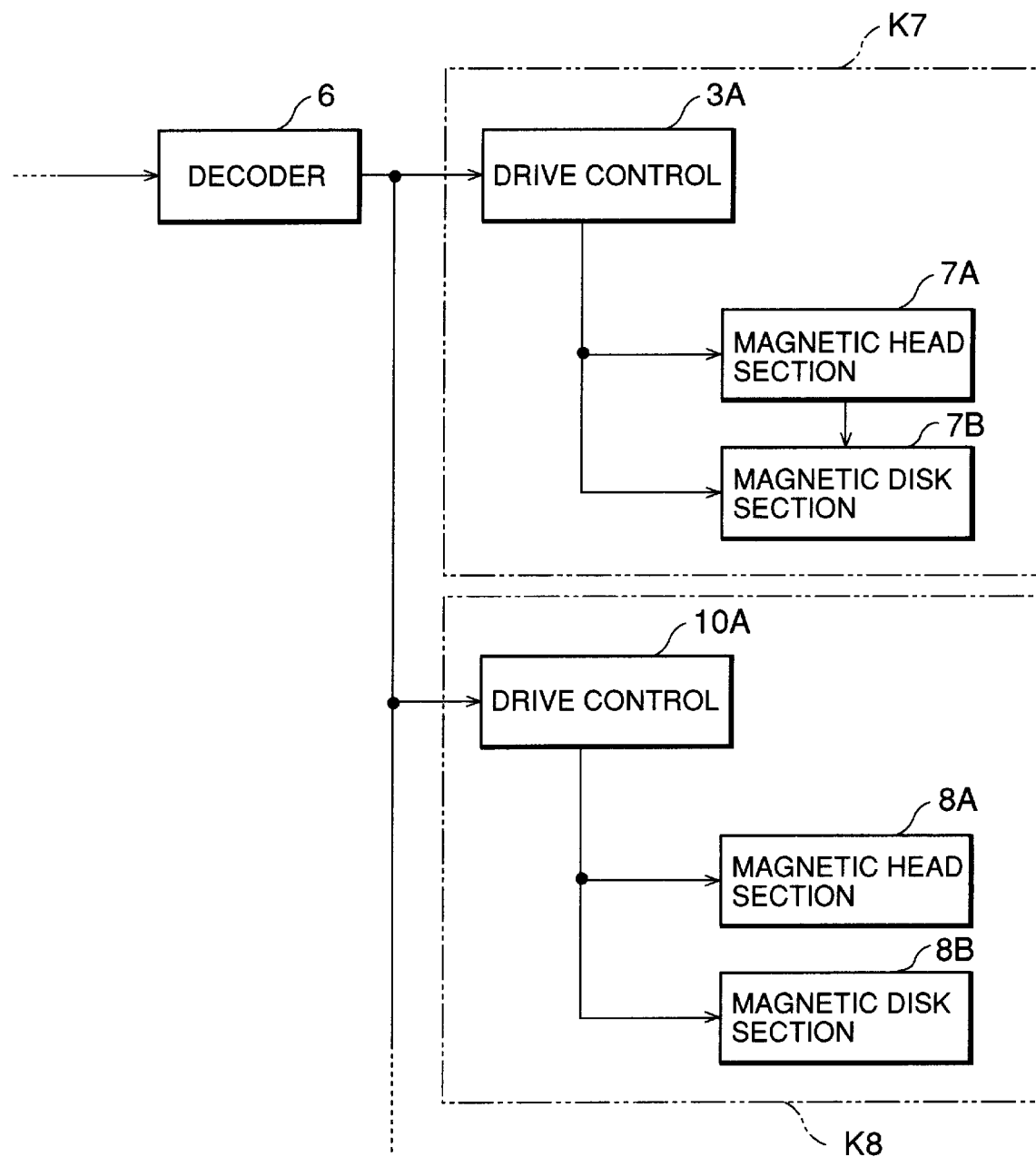
FIG. 1 is a block diagram schematically showing a magnetic disk apparatus embodying the present invention.

Referring to FIG. 1 of the drawings, a hard disk apparatus embodying the present invention is shown and includes a decoder 6 and a plurality of (two in the exemplary embodiment) HDDs #1 (K7) and #2 (K8). The decoder 6 transforms logical addresses received from a host to the physical addresses respectively assigned to the HDDs #1 and #2. The HDD #1 has a magnetic disk section 7B, a magnetic head section 7A, and a drive control 3A, as illustrated. The head section 7A selectively writes or reads data in or out of the disk section 7B. The drive control 3A controllably drives the head section 7A in accordance with the physical address output from the decoder 6. Likewise, the HDD #2 has a magnetic disk section 8B, a magnetic head section 8A and a drive control 10A which are identical in construction and operation with the above sections 7B, 7A and 3A, respectively.

The host sends the logical address of a disk diagnosis command to the decoder 6. The decoder 6 has a diagnosis address transforming function, i.e., transforms the input logical address to an HDD-by-HDD physical address. The drive controls 3A and 10A each executes control over a write/read test on the basis of the physical address output from the decoder 6. In the illustrative embodiment, a physical HDD is constituted by a pair of magnetic disk section and magnetic head section. The disk sections 7B and 8B include one or more magnetic disks each while the head sections 7A and 8A include one or more magnetic heads each.

In the above construction, despite that the host designates either one of the HDDs #1 and #2 with the logical address of the diagnosis command, the decoder 6 transforms the logical address to the BDD-by-HDD physical addresses. This allows each of the drive controls 3A and 10A of the HDDs #1 and #2 to diagnose the respective HDD. Therefore, even when the magnetic disk apparatus includes a plurality of HDDs, all the HDDs can be diagnosed at the same time, enhancing the reliability of the apparatus. Further, the host can designate the area to diagnose with the logical address without regard to the configuration of the magnetic disk apparatus. It is therefore not necessary to take account of the number of HDDs included in the magnetic disk apparatus or the specifications of the apparatus, so a diagnosis program can be produced with a minimum of load.

The decoder 6 further has a diagnosis address setting function, i.e., sets the radially innermost cylinder of the individual HDD as a physical address to be diagnosed. Therefore, test data are written to and read out of the area of the individual HDD other than the user area.

Figure 2:
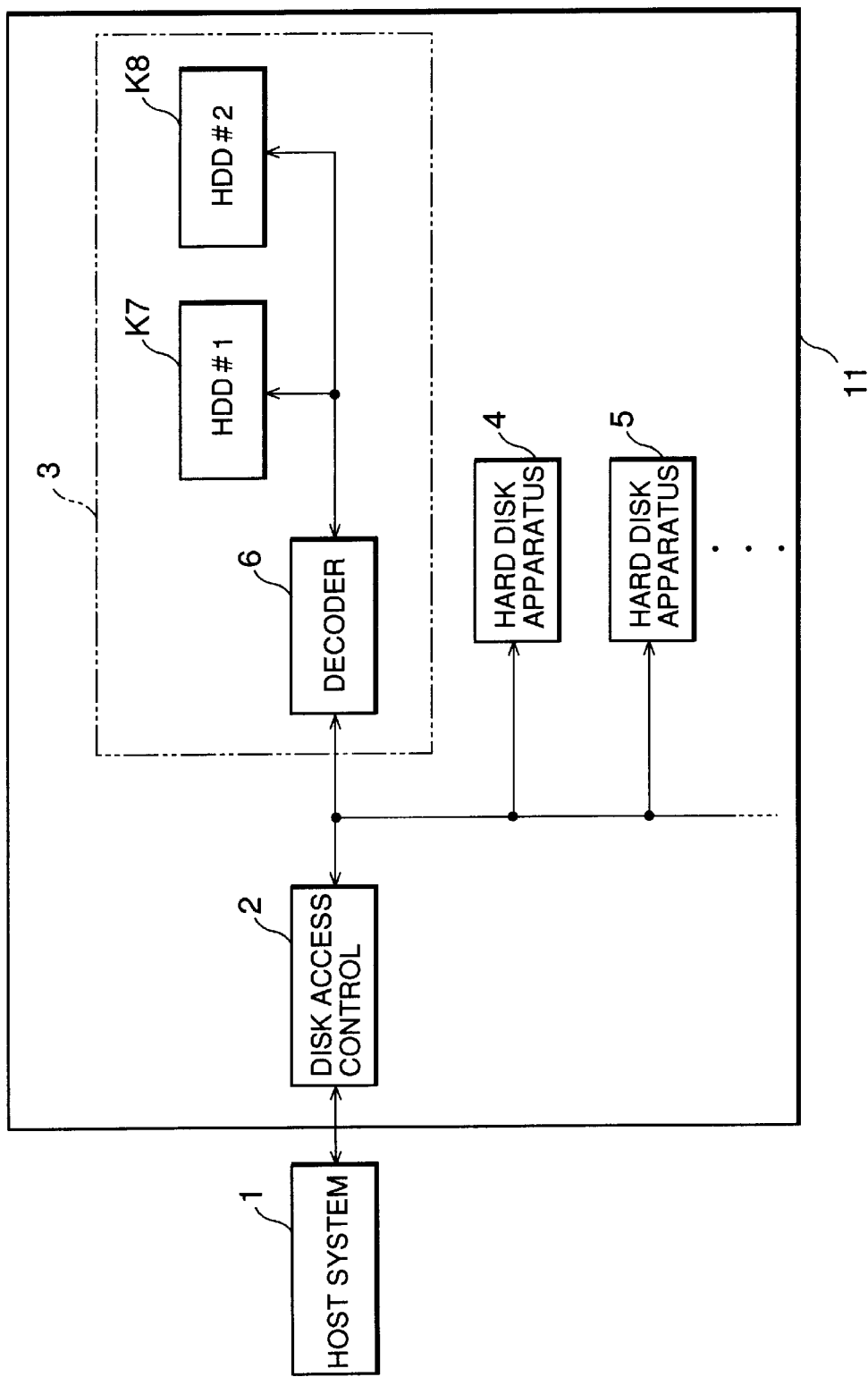
FIG. 2 is a schematic block diagram of a magnetic disk system including the apparatus shown in FIG. 1.

FIG. 2 shows a hard disk system 11 including the above configuration of the illustrative embodiment. As shown, the hard disk system 11 has a disk access control 2 and a plurality of hard disk apparatuses 3, 4, 5 and so forth each having the construction shown in FIG. 1. The disk access control 2 controls an access form a host system 1 and controls the hard disk apparatuses 3, 4, 5 and so forth. The apparatus 3 has the HDDs #1 (K7) and #2 (K8) and the decoder 6 for selectively distributing a control signal and data received from the data access control 2 to the HDD #1 or #2.

Figures 3A, 3B:
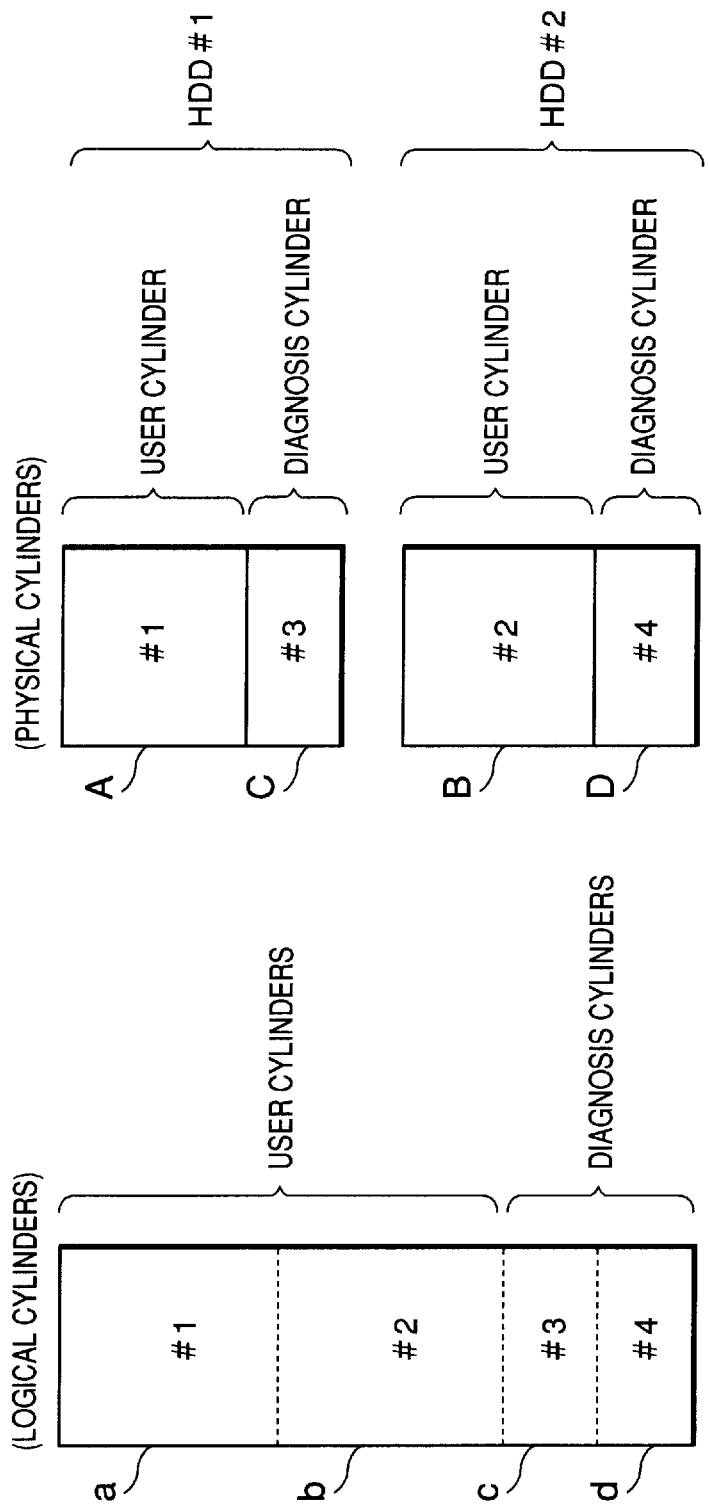
FIG. 3A shows specific logical cylinders arranged in the illustrative embodiment, as seen from a host.
FIG. 3B shows specific cylinders actually assigned to the individual physical HDD included in the embodiment.

The operation of the hard disk system shown in FIG. 2 will be described hereinafter. First, assume that the host system 1 accesses the magnetic disk apparatus 3 for writing or reading data therein or thereoutof. The apparatus 3 includes user cylinders available for the user and a diagnosis cylinder for diagnosis. When the host system 1 accesses the apparatus 3, the decoder 6 selects either one of the physical HDDs #1 and #2 on the basis of the logical cylinder to be used by the host system 1, and then controls the HDD selected. When the host system 1 sends a read/write command meant for, e.g., a user cylinder #1 (a, FIG. 3A), the command is routed through the disk access control 2 to the decoder 6. In response, the decoder 6 selects the HDD #1 corresponding to the user cylinder #1, and then writes or read data in or out of a user cylinder #1 (A, FIG. 3B) included in the HDD #1. This is also true when the read/write command is meant for a user cylinder #2 (b, FIG. 3A); the decoder 6 selects the HDD #2 and writes or reads data in or out of a user cylinder #2 (B, FIG. 3B).

When the host system 1 executes HDD diagnosis, test data are written to and read out of diagnosis cylinders in order to protect data stored in user cylinders from damage. Specifically, the host system 1 sends a continuous diagnosis cylinder represented by a logical cylinder to the decoder 6. In response, the decoder 6 allocates the diagnosis cylinder to the HDDs #1 and #2. When a diagnosis cylinder #3 (c, FIG. 3A) included in the logical cylinders is to be used, the decoder 6 selects a diagnosis cylinder #3 (C, FIG. 3B) included in the HDD #1 as a physical cylinder, in the same manner as with the user cylinder. When a diagnosis cylinder #4 (d, FIG. 3A) included in the logical cylinders is to be used, the decoder 6 selects a diagnosis cylinder #4 (D, FIG. 3B) as a physical cylinder. This function of the decoder 6 will be referred to as an allocating function.

The above data write/read procedure and test data read/write procedure are also effected with the other magnetic disk apparatuses 4 and 5 as needed.

As stated above, the decoder 6 allocates the diagnosis cylinder to the two HDDs so as to allow the diagnosis program of the host system 1 to diagnose the two HDDs as if it diagnosed a single HDD.

Figure 4:
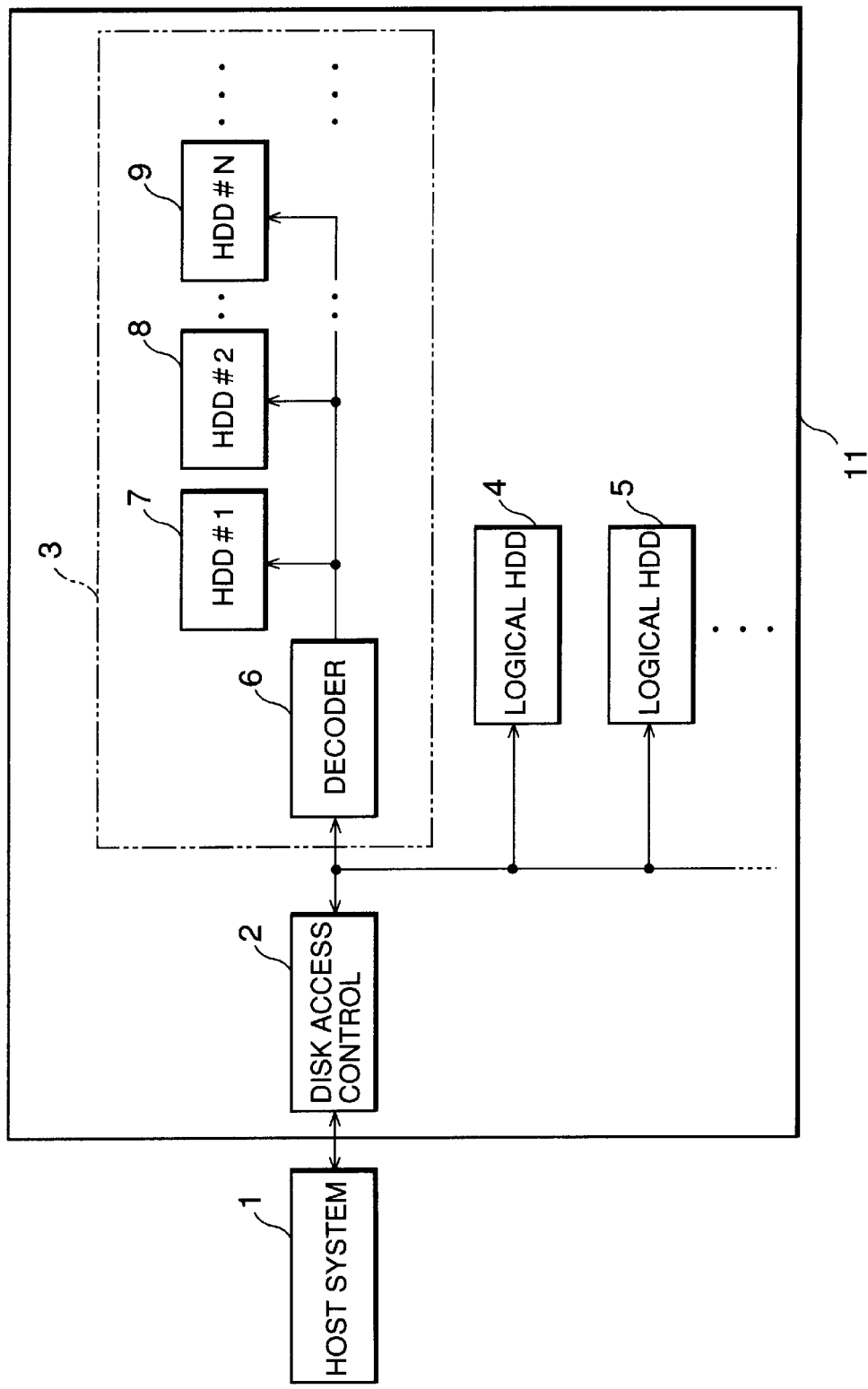
FIG. 4 shows a modification of the embodiment.
Figure 5A:
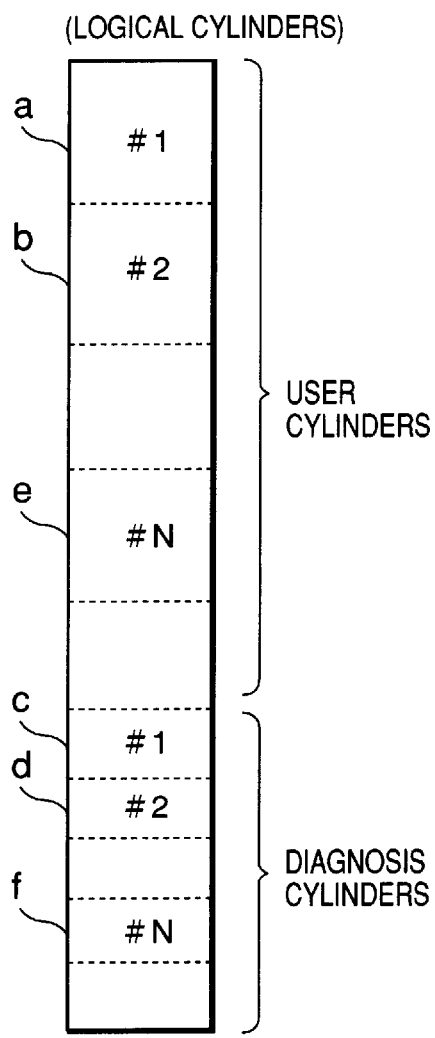
FIG. 5A shows specific logical cylinders arranged in the modification shown in FIG. 4.
Figure 5B:
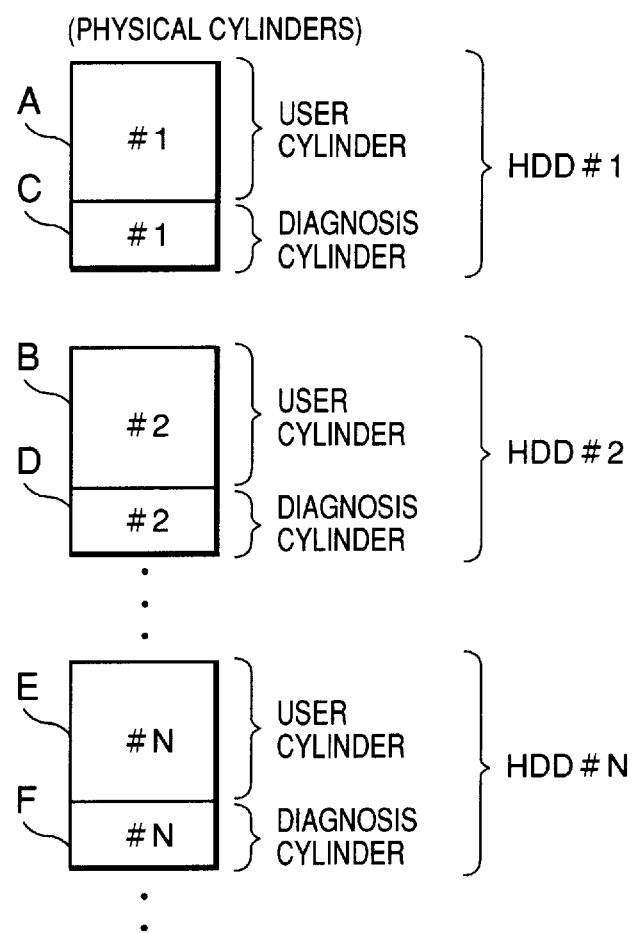
FIG. 5B shows specific cylinders actually assigned to the individual physical HDD included in the modification shown in FIG. 4.

Reference will be made to FIGS. 4, 5A and 5B for describing a modification of the above embodiment. As shown, the magnetic disk apparatus 3 has the decoder 6 and more than three HDDs 7, 8, 9 and so forth. When the host system 1 accesses any one of the HDDs, the decoder 6 selects one of HDDs #1 through #N (FIG. 5B) on the basis of the logical user cylinder (FIG. 5A) to be used by the host system 1, and then controls the HDD selected. For example, when the host system accesses a user cylinder #1 or #2 (A or B, FIG. 5B), a procedure similar to one described with reference to FIG. 2 is executed in order to write or read data in or out of the HDD #1 or #2. Data are written to or read out of a user cylinder #N included in the HDD #N in the same manner as they are written to the user cylinder #1 or #2.

At the time of HDD diagnosis from the host system 1, a continuous diagnosis cylinder is provided in the form of a logical cylinder. The diagnosis cylinder is divided in one-to-one correspondence to the HDDs #1 through #N and allocated to the HDDs as physical cylinders. Then test data are written to and read out of the HDD selected by the decoder 6. In this manner, the decoder 6 allocates the diagnosis cylinder to the HDDs #1 through #N, so the diagnosis program of the host system 1 can diagnose all the HDDs #1 through #N as it diagnosed a single HDD.

As stated above the embodiment and its modification each has a plurality of HDDs in each magnetic disk apparatus and provides each HDD with a diagnosis cylinder. This allows a diagnosis program stored in, e.g., a host system to diagnose all the HDDs of the apparatus at a time, enhancing the reliability of the apparatus.

In summary, in accordance with the present invention, despite that a host designates a particular HDDs with the logical address of a diagnosis command, a decoder transforms the logical address to HDD-by-HDD physical addresses. This allows a drive control of to diagnose the respective HDD. Therefore, even when a magnetic disk apparatus includes a plurality of HDDs, all the HDDs can be diagnosed at the same time, enhancing the reliability of the apparatus. Further, the host can designate the area to diagnose with the logical address without regard to the configuration of the magnetic disk apparatus. It is therefore not necessary to take account of the number of HDDs included in the magnetic disk apparatus or the specifications of the apparatus, so a diagnosis program can be produced with a minimum of load.

While the present invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A magnetic disk apparatus comprising:

a plurality of hard disk drives (HDDs); and a decoder for transforming logical addresses received from a host to physical addresses respectively assigned to said plurality of HDDs as user cylinders;

said plurality of HDDs each comprising:

a magnetic disk section including at least one magnetic disk for storing data;

a magnetic head section for selectively writing or reading data in or out of said magnetic disk section; and a drive control for controllably driving said magnetic head section in accordance with the physical address output from said decoder;

said decoder having a diagnosis address transforming function for transforming logical addresses of a diagnosis command received from the host to the physical addresses of said plurality of HDDs as diagnosis cylinders associated with each of said plurality of HDDs;

said drive control having a function of controlling a write/read test at the physical addresses produced by said diagnosis address transforming function by test data being written to and read out of said diagnosis cylinders to protect data stored in said user cylinders from damage.

2. An apparatus as claimed in claim 1, wherein said decoder has a diagnosis address setting function for setting the physical addressees of radially innermost cylinders of said plurality of HDDs as the physical addresses to be diagnosed.

3. An apparatus as claimed in claim 1, wherein said decoder has an allocating function for allocating, when the logical addresses of the diagnosis command are continuous addresses, dividing said logical addresses and allocating said logical addresses divided to the physical addresses.

4. An apparatus as claimed in claim 1, wherein said magnetic disk section comprises a plurality of magnetic disks, said magnetic head section including a plurality of magnetic heads.

5. A hard disk system comprising:

a plurality of magnetic disk apparatuses each comprising:

a plurality of hard disk drives (HDDs); and a decoder for transforming logical addresses received from a host to physical addresses respectively assigned to said plurality of HDDs as user cylinders;

said plurality of HDDs each comprising:

a magnetic disk section including at least one magnetic disk for storing data;

a magnetic head section for selectively writing or reading data in or out of said magnetic disk section; and a drive control for controllably driving said magnetic head section in accordance with the physical address output from said decoder;

said decoder having a diagnosis address transforming function for transforming logical addresses of a diagnosis command received from the host to the physical addresses of said plurality of HDDs as diagnosis cylinders associated with each of said plurality of HDDs;

said drive control having a function of controlling a write/read test at the physical addresses produced by said diagnosis address transforming function by test data being written to and read out of said diagnosis cylinders to protect data stored in said user cylinders from damage; and a disk access control for collecting controlling operation of said plurality of magnetic disk apparatuses.

* * * * *